United States Patent [19]

Bright

[11] Patent Number: 5,050,642
[45] Date of Patent: Sep. 24, 1991

[54] PRESSURE-COMPENSATED THREE-WAY SOLENOID VALVE

[75] Inventor: John S. Bright, Newport News, Va.

[73] Assignee: Siemens Automotive L.P., Auburn Hills, Mich.

[21] Appl. No.: 571,798

[22] Filed: Aug. 23, 1990

[51] Int. Cl.⁵ .......................................... F15B 13/044
[52] U.S. Cl. ........................... 137/625.65; 251/129.07; 251/129.14; 251/129.17
[58] Field of Search ............... 137/625.65, 129.07, 137/129.14, 129.17

[56] References Cited

U.S. PATENT DOCUMENTS

| | | | |
|---|---|---|---|
| 3,396,751 | 8/1968 | Bender | 137/625.65 |
| 3,606,241 | 9/1971 | Bornholdt. | |
| 3,661,183 | 5/1972 | Komaroff et al. | 137/625.65 |
| 3,985,333 | 10/1976 | Paulsen. | |
| 4,442,998 | 4/1984 | Ohyama et al. | 137/625.5 X |
| 4,641,686 | 2/1987 | Thompson | 137/625.65 |
| 4,719,943 | 1/1988 | Perach | 137/625.65 |

*Primary Examiner*—Gerald A. Michalsky
*Attorney, Agent, or Firm*—George L. Boller; Russel C. Wells

[57] ABSTRACT

The valve has a diaphragm connected to the operating mechanism which couples the valve element with the solenoid. Opposite sides of the diaphragm are respectively piloted to one pair of the three ports. The valve may also have a second diaphragm which is also connected to the operating mechanism and has its opposite sides respectively piloted to another pair of the three ports.

16 Claims, 2 Drawing Sheets

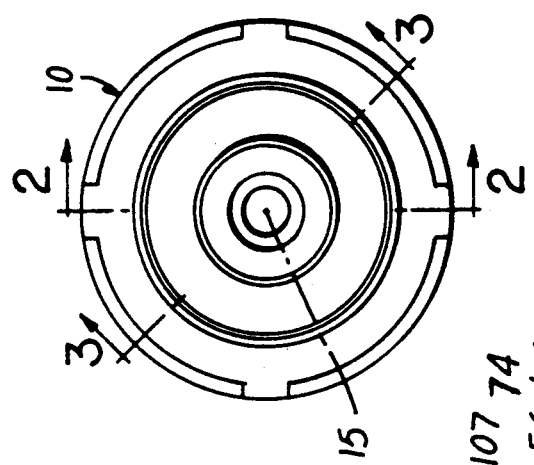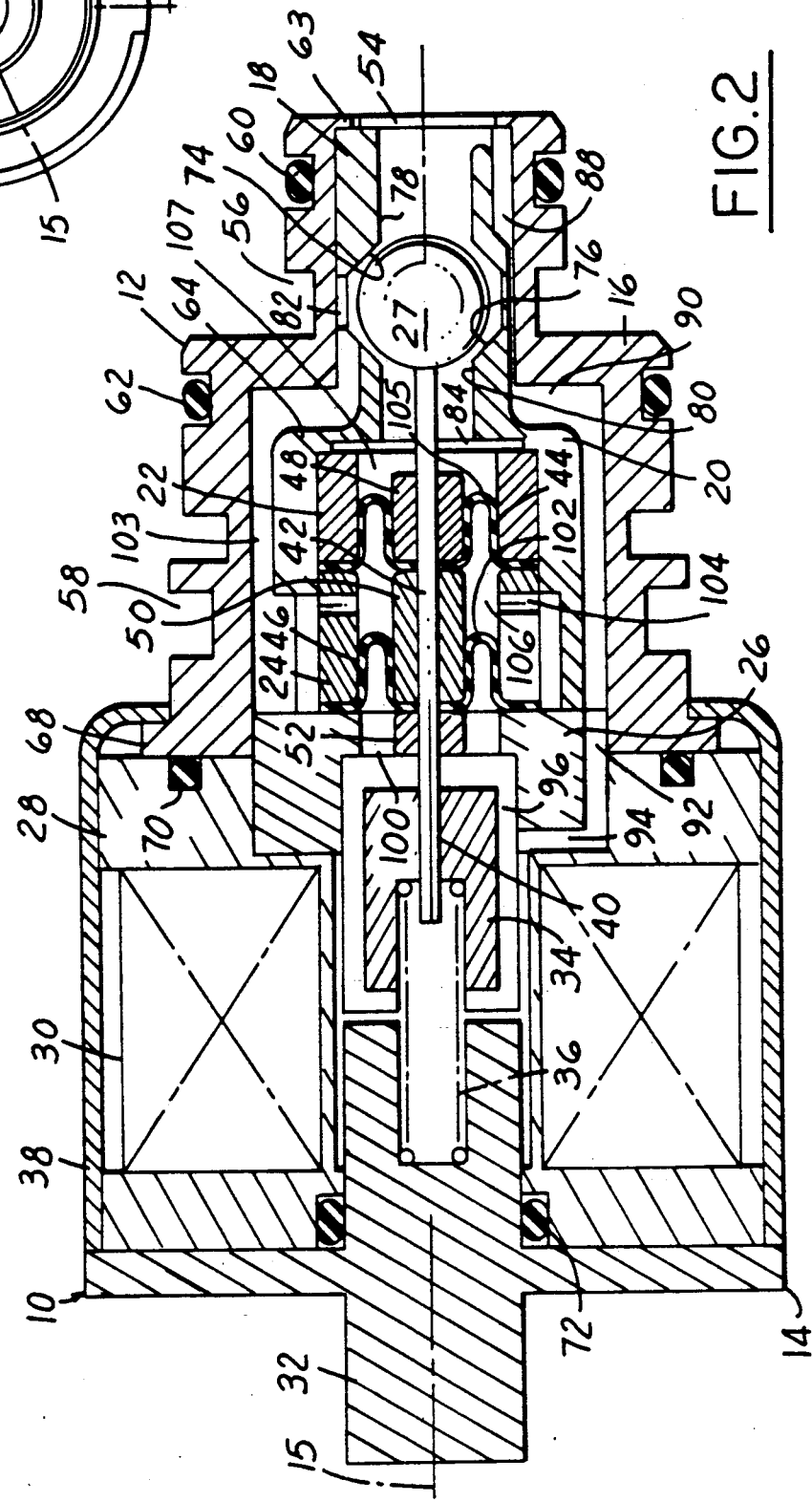

PRESSURE-COMPENSATED THREE-WAY SOLENOID VALVE

FIELD OF THE INVENTION

This invention relates to an improvement in a three-way solenoid-operated valve.

BACKGROUND AND SUMMARY OF THE INVENTION

Pressure-compensated spool valves have been previously made using close-fitting pistons. That technique requires tight tolerances on the spool and the valve bore. Viscous and contact friction exist between the spool and bore, and their presence limits the extent to which such as a valve can be successfully pulse-width-modulated in response to the application of a pulse-width-modulated energizing signal to the solenoid.

The present invention provides a solution to this problem by the use of one or two flexible diaphragms to support the mechanism by means of which motion of the solenoid's armature is transmitted to the valve element that controls the fluid communication between the valve's source, control, and drain ports. The mechanism no longer requires the close fit of a spool to a bore. Pilot pressures from selected ones of said ports are communicated by pilot passages to opposite sides of each diaphragm used.

One embodiment of valve constructed in accordance with the inventive principles comprises a single diaphragm whose opposite sides are piloted to the control and drain ports to provide pressure-compensation with respect to the control/drain port pressure differential. In another embodiment, twin diaphragms pressure-compensate the valve with respect to source/control port pressure differential and control/drain port pressure differential. In the latter embodiment, one side of one diaphragm is piloted to source port pressure, and the opposite side of the same diaphragm is piloted to control port pressure; one side of the second diaphragm is piloted to control port pressure while its opposite side is piloted to drain port pressure.

The essentially frictionless nature of the operation of a diaphragm, particularly a rolling bellows type diaphragm, allows the valve to have a sufficiently fast response for use in pulse-width modulated pressure control applications. The pressure-compensation forces applied to the mechanism counter hydraulic forces acting on the valve element so that the transmittal of hydraulically-induced forces to the solenoid can be controlled. The relationship of diaphragm area to valve seat area determines the nature of the pressure-compensation. By properly relating the areas in a particular way, it is possible to essentially eliminate the transmission of any hydraulically-induced forces to the solenoid. By properly relating the areas in any one of other particular ways, it is possible to impart any one of a number of different hydraulically-induced bias force characteristics. In any particular valve, the sizing of the diaphragms and valve seat areas is conducted in accordance with conventional principles of hydraulic design. Hence, the pressure-compensating feature that results from the practice of principles of the present invention can be embodied in any of a number of different ways to attain any particular one of a number of different pressure-compensation characteristics for a three-way valve.

It should be pointed out that the use of pressure-compensating diaphragms in valves is not novel per se. U.S. Pat. Nos. 3,606,241 and 3,985,333 illustrate this. The present invention is however a novel application of pressure-compensating diaphragms to a three-way valve through the use of pilot passages. The improved responsiveness of a three-way valve embodying principles of the present invention and the ability to design such a valve to attain a desired pressure-compensation characteristic are especially significant attributes of the invention. As a consequence, the invention adapts a three-way solenoid valve for a wider range of pulse-width-modulated uses, including an electrically controlled transmission valve in an automotive vehicle transmission.

Further features, advantages, and benefits of the invention will be seen in the ensuing description and drawings, which present a presently preferred embodiment of the invention according to the best mode contemplated at the present time for carrying out the invention.

BRIEF DESCRIPTION OF THE DRAWINGS

FIG. 1 is an axial end view of a valve embodying principles of the invention.

FIG. 2 is an enlarged longitudinal cross-sectional view through the valve as taken in the direction of arrows 2—2 in FIG. 1.

DESCRIPTION OF THE PREFERRED EMBODIMENT

Figure 3:
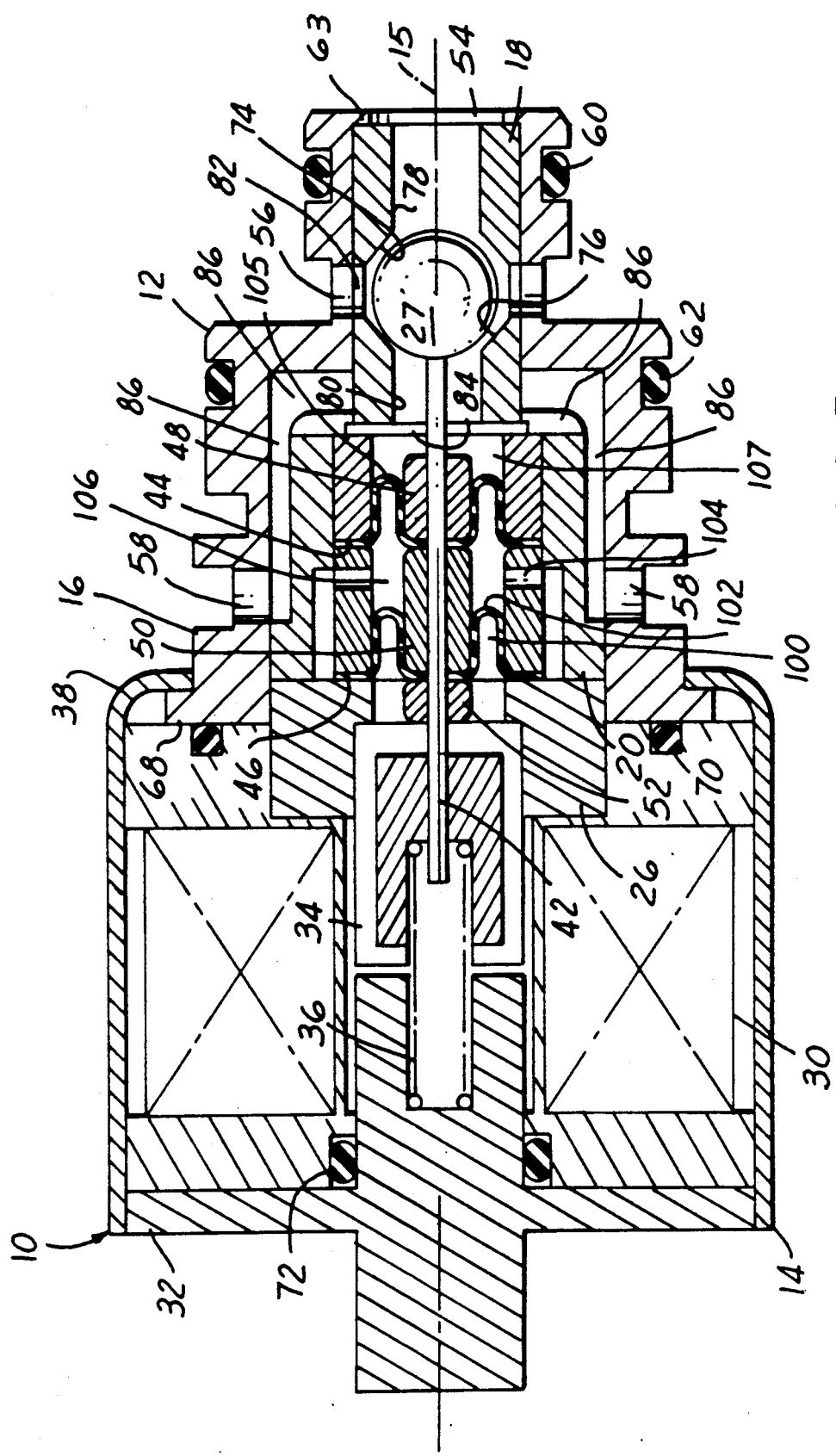
FIG. 3 is a similarly enlarged longitudinal cross-sectional view through the valve as taken in the direction of arrows 3—3 in FIG. 1, this cross-sectional view being taken at 45 degrees to the cross-sectional view of FIG. 2.

An exemplary solenoid-actuated three-way valve 10 comprises a body portion 12 and a solenoid portion 14 which are coaxial about the valve's central longitudinal axis 15. The illustrated valve has been designed for usage as an electrically operated transmission valve for the transmission of an automotive vehicle.

Body portion 12 comprises the following individual parts: a metal valve body 16; a first seat member 18; a second seat member 20; a first ring 22; a second ring 24; an annular armature guide member 26; and a valve element 27. Solenoid portion 14 comprises the following individual parts: a bobbin 28; a solenoid coil 30; a stator 32; an armature 34; a helical spring 36; and a metal shell 38. A coupling mechanism 40 comprising a metal rod 42 couples armature 34 with valve element 27. Axially spaced-apart twin diaphragms 44, 46 (the illustrated rolling diaphragms are preferred) are centrally affixed to rod 42 with the aid of tubular diaphragm retainers 48, 50, 52. The parts 18, 20, 22, 24, 48, 50, 52 can be fabricated from metal by machining or molding, preferably by molding of suitable plastics, or plastic-composites.

Body 16 has a stepped tubular shape for fitting to a vehicle transmission by insertion of the right-hand end (FIGS. 2 and 3) into a complementary shaped bore (not illustrated) in the transmission. (For convenience in description, this and subsequent references to either the right-hand or left-hand end of the valve or any of its parts refer to FIGS. 2 and 3.) There are three ports in body 16: a source, or pressure, port 54 for communication with a source of pressure fluid; a control port 56 for communication with a load to be controlled by the valve; and a drain, or exhaust, port 58. Source port 54 is at the axial tip end of the valve body and is in the form of a single circular hole. Control port 56 is in the form of a circumferentially continuous groove extending around the exterior of the sidewall of the valve body in axially spaced relation to source port 54 and four circular holes arranged 90 degrees apart about axis 15, each extending from the bottom of the groove, through the valve body's sidewall, to the sidewall's circular interior surface. Drain port 58 is also in the form of a circumferentially continuous groove extending around the exterior of the sidewall of the valve body and four circular holes arranged 90 degrees apart about axis 15, each extending from the bottom of the latter groove, through the valve body's sidewall, to the sidewall's circular interior surface, but in axially spaced relation to the reduced-diameter tip end that contains both ports 54 and 56. An elastomeric O-ring seal 60 is disposed in a circular external groove extending around the valve body in its tip end and lying axially between ports 54 and 56 for sealing to the wall of the bore into which the valve is inserted when the valve is put to use so that pressure fluid at the source port will not leak to the control port. Another elastomeric O-ring seal 62 is disposed in a circular external groove extending around the valve body in its diametrically larger region and lying axially between ports 56 and 58 for sealing to the wall of the bore into which the valve is inserted when the valve is put to use so that fluid at the control port will not leak to the drain port.

Seat member 18 has a tubular shape and is assembled into valve body 16 via the left-hand end of the valve body during the valve fabrication process. Seat member 18 is pressed into the interior of the valve body's tip end and against a radially inwardly directed lip 63 circumscribing port 54 so that after assembly the seat member is coaxial with axis 15. Valve element 27 is a circular metal sphere and is assembled into the valve body after seat member 18. Seat member 20 has a tubular shape and is assembled into the valve body after valve element 27 to assume coaxiality with seat member 18.

Assembled to seat member 20 are the twin diaphragms 44, 46. The diaphragms are fabricated from any conventional material that is impervious to the controlled fluid. The valve fabrication process includes a step of inserting ring 22 into seat member 20 via the larger open left-hand end thereof and fitting therein against a shoulder 64. The outer circumferential margin of diaphragm 44 is held between the left-hand end of ring 22 and the right-hand end of ring 24 after the latter has been assembled into the seat member; and as the fabrication process proceeds, the outer circumferential margin of diaphragm 46 comes to be held between the left-hand end of ring 24 and the right-hand end of guide member 26. Rod 42 passes through central circular holes in diaphragms 44, 46, and the retainers 48, 50, 52 have press-fits on rod 42 to sandwich the inner circumferential margins of the diaphragms in the manner shown so that fluid leakage past a diaphragm is not possible. It can be seen that mechanism 40 is suitably supported by the diaphragms for actuation by armature 34 with virtually negligible viscous and contact friction.

Armature guide member 26 provides both a means for fitting valve body 16 to bobbin 28 and for guiding the axial travel of armature 34. Rod 42 passes through member 26, and its left-hand end joins with armature 34 so that the rod will be axially displaced in unison with the armature's displacement by the solenoid. Spring 36 acts between stator 32 and armature 34 so as to bias the latter axially in the direction toward source port 54. The outer margin of a circular flange portion of stator 32 joins, by any suitable means such as staking, crimping, etc., with the left-hand end of shell 38, and the coil-carrying bobbin 28 is axially held between that circular flange portion of the stator and the left-hand end of valve body 16, the right-hand end of the shell having a flange extending over a lip 68 extending around the exterior of the left-hand end of the valve body to complete the assembly. Two additional elastomeric O-ring seals 70, 72 are disposed as shown to prevent fluid leakage from the valve.

Each tubular-shaped seat member 18, 20 comprises a respective frusto-conically shaped seat surface 74, 76 with a respective orifice 78, 80. Seat surfaces 74, 76 are coaxial with axis 15 and face each other, axially constraining valve element 27 between them such that the valve element can move over a short distance back and forth between the two seats. Valve portion 12 contains internal fluid passageway structure for communicating the three ports 54, 56, 58. Valve element 27 is disposed in a first portion of that passageway structure which extends axially between the two seat members 18, 20. A second portion of that passageway structure is formed by the particular construction of the left-hand end of seat member 18. That construction comprises one or more axial slots 82 of limited circumferential extent in the seat member extending from the left-hand end of seat surface 74. These slots provide the aforementioned second portion of the fluid passageway structure to communicate the first portion of the passageway structure with control port 56. Orifice 78 forms a third portion of the fluid passageway structure to communicate source pressure to the right-hand end of seat surface 74. A fourth portion of the fluid passageway structure communicates the left-hand end of seat surface 76 to drain port 58, and it conjointly defined by orifice 80 and the construction of the diametrically larger left-hand portion of seat member 20. That construction comprises a shallow counter-bore 84 immediately adjacent the left-hand end of orifice 80 and several circumferentially-spaced apart, axially extending grooves 86 (FIG. 3) that communicate counter-bore 84 to port 58. Grooves 86 are of limited circumferential extent and suitably circumferentially spaced apart from grooves 82 to prevent unacceptable cross-leakage.

The pressure-compensation of valve 10 is attained by piloting pressures from the three ports 54, 56, 58 to diaphragms 44, 46 in the following manner. Source pressure at port 54 is piloted to the left side of diaphragm 46; control pressure at port 56 is piloted to both the right side of diaphragm 46 and the left side of diaphragm 44; and drain pressure is piloted to the right side of diaphragm 44. The pilot passage structure comprises a source pressure pilot passage which is conjointly formed by seat members 18, 20, valve body 16, and armature 34. The exterior surface of seat member 18 has at least one axial groove 88 (FIG. 2) of limited circumferential extent and spaced circumferentially of slots 82 to prevent unacceptable cross-leakage of fluid. The groove's right-hand end is in communication with port 54, and its left-hand end is in communication with the right-hand end of a corresponding axial groove 90 in the exterior surface of seat member 20. Groove 90 is suitably circumferentially spaced apart from grooves 86 (FIG. 3) to prevent unacceptable cross-leakage. The left-hand end of groove 90 is in communication with the right-hand end of a corresponding axial groove 92 in the exterior surface of armature guide member 26. The left-hand end of groove 92 is communicated by a radial groove 94 with an axial groove 96 in the exterior surface of armature 34. The right-hand end of groove 96 communicates with an annular-shaped volume, or zone, 100 surrounding rod 42, retainer 52, and that portion of diaphragm 46 that is in contact with the left-hand end segment of the sidewall of retainer 50. The right-hand end of volume 100 is bounded by a reversal 102 in diaphragm 46. The pilot passage structure further comprises a control pressure pilot passage which is conjointly formed by seat member 20, valve body 16, and ring 24. Seat member 20 comprises one or more axial grooves 103 (FIG. 2) in its exterior surface for communicating slots 82 (which are in communication with control port 56) to the radially outer ends of holes 104 that extend through the wall of ring 24. The radially inner ends of holes 104 communicate with an annular volume, or zone, 106 whose axial ends are bounded respectively by reversal 102 in diaphragm 46 and a like reversal 105 in diaphragm 44. The pilot passage structure further comprises a drain pressure pilot passage which is provided by the communication of counterbore 84 to the right-hand end of the axial through-hole of ring 22. The volume of the ring's through-hole lying to the right of reversal 105 and surrounding the right-hand end of retainer 48 and rod 42 represents a zone 107 to which drain pressure is piloted.

Valve element 27 can move axially within the valve to alternately seat on and unseat from seat surfaces 74, 76. When seated on seat surface 74, the valve element closes orifice 78 and opens orifice 80 to control port 56. When seated on seat surface 76, the valve element closes orifice 80 and opens orifice 78 to control port 56. With solenoid coil 30 not energized, spring 36 acts through armature 34 and rod 42 to force valve element 27 to seat on seat surface 74; in this position, the valve element allows communication between control port 56 and drain port 58. With the solenoid coil energized, armature 34 is displaced to the left against the spring force to similarly displace rod 42. Rod 42 is physically unattached to valve element 27 and hence does not pull the valve element against seat surface 76. It is the source port pressure acting directly on valve element 27 that pushes the valve element onto seat surface 76 to close orifice 80; in this position, the valve element allows communication between source port 54 and control port 56. By pulse width modulating the solenoid coil, the respective source and drain port pressures are modulated to the control port to create control port pressure corresponding to the duty cycle of the pulse width modulated electrical signal operating the solenoid coil. It is in this way that the valve controls the control port pressure.

The pressure-compensation that is provided by the present invention enhances the responsiveness of a three-way valve to pulse width modulated operation. While the illustration of FIGS. 1-3 compensates for differentials between drain and control port pressures and between control and source port pressures, it should be readily apparent to one of ordinary skill in the art that elimination of one diaphragm and the piloting of port pressures to its opposite sides will yield a single diaphragm embodiment that is pressure-compensated for the pressure differential between only two ports. While a valve embodying principles of the invention is especially improved for purposes of pulse width modulated operation, such a valve need not necessarily be operated in a pulse width modulated manner, and can be used to control a pressure either statically, or continuously. The valve is quite immune to fluid viscosity changes. Moreover, the inventive principles are applicable to valves that control liquid (hydraulic) fluid pressure and valves that control gaseous (pneumatic) fluid pressure. The use of an unattached ball for the valve element can contribute to the responsiveness of the valve, and should be considered a preferred, but not necessarily essential, feature of the invention. Although not specifically illustrated in the drawing Figs. in the interest of clarity, the valves should have keying mechanisms between various internal ports to assure their proper circumferential alignment and fit at assembly so that each of the various passages has the proper continuity, as described. From the present disclosure, the reader can appreciate that the inventive principles may be embodied in any of a number of valve designs that constitute legal equivalents of the following claims.

What is claimed is:

1. A three-way valve that is operated by a solenoid and comprises a valve body containing three ports, namely a source port adapted to be communicated to a source of pressure fluid, a control port adapted to be communicated to a load that is to be controlled, a drain port adapted to be communicated to a drain, and internal fluid passageway structure providing fluid communication between said ports, two valve seats each of which comprises a corresponding orifice and which are disposed in said passageway structure in coaxially-aligned, spaced-apart, face-to-face relation to axially constrain between themselves within a first portion of said passageway structure a valve element which can move back and forth between said seats to alternately open and close said orifices, said passageway structure comprising a second portion that communicates a first of said ports with said first passageway portion, a third portion that communicates a second of said ports with a first of said orifices, and a fourth portion that communicates a third of said ports with a second of said orifices, a mechanism including said solenoid that acts directly on said valve element along the co-axis of said seats to control the motion of said valve element, characterized in that the valve comprises pressure-compensating means for pressure-compensating the valve with respect to pressure differential between two particular ones of said three ports, said pressure-compensating means comprising internal pilot passage structure within said body, a diaphragm that has an outer perimeter sealed to a wall portion of said pilot passage structure for creating in cooperation with said wall portion two zones that are fluid-isolated from each other by said diaphragm, said diaphragm having a central region that is affixed to a portion of said mechanism disposed within said pilot passage structure so as to move in unison with said mechanism, said pilot passage structure comprising a first pilot portion piloting one of said two particular ones of said three ports to a first of said zones and a second pilot portion piloting the other of said two particular ones of said three ports to a second of said zones, said valve body comprising a tubular outer body portion and a tubular inner body portion which is disposed within said tubular outer body portion such that said tubular outer body portion circumferentially surrounds said tubular inner body portion, said mechanism passing through said tubular inner body portion, at least one of said first and second pilot portions having a portion thereof cooperatively defined by and between said tubular outer body portion and said tubular inner body portion, said diaphragm being sealed to and extending across said tubular inner body portion such that said first and second zones extend into said tubular inner body portion to opposite sides of said diaphragm.

2. A valve as set forth in claim 1 characterized in that said one of said two particular ones of said three ports is said control port.

3. A valve as set forth in claim 2 characterized in that said first of said ports is said control port.

4. A valve as set forth in claim 3 characterized in that said second of said ports is said drain port.

5. A valve as set forth in claim 3 characterized in that said second of said ports is said source port.

6. A valve as set forth in claim 1 characterized in that said second of said ports is said source port, said third of said ports is said drain port, and said mechanism comprises a rod acting on a face of said valve element directly opposite a face of said valve element that faces said first orifice.

7. A valve as set forth in claim 1 characterized in that said valve element is a sphere that is acted upon by, but unattached to, a rod portion of said mechanism, said seats comprise respective frusto-conical seating surfaces circumscribing their respective valve seats, said first portion of said passageway structure comprises a circular cylindrical wall, said second portion of said passageway structure comprises one or more radial holes through said circular cylindrical wall, and said central portion of said diaphragm is affixed to said rod portion of said mechanism.

8. A valve as set forth in claim 1 including means for pulse width modulating said solenoid such that the pressure at said control port is caused to be a function of (a) the pressure at said source port, (b) the pressure at said drain port, and (c) the duty cycle of the pulse width modulation.

9. A three-way valve that is operated by a solenoid and comprises a valve body containing three ports, namely a source port adapted to be communicated to a source of pressure fluid, a control port adapted to be communicated to a load that is to be controlled, a drain port adapted to be communicated to a drain, and internal fluid passageway structure providing fluid communication between said ports, two valve seats each of which comprises a corresponding orifice and which are disposed in said passageway structure in coaxially-aligned, spaced-part, face-to-face relation to axially constrain between themselves within a first portion of said passageway structure a valve element which can move back and forth between said seats to alternately open and close said orifices, said passageway structure comprising a second portion that communicates a first of said ports with said first passageway portion, a third portion that communicates a second of said ports with a first of said orifices, and a fourth portion that communicates a third of said ports with a second of said orifices, a mechanism including said solenoid that acts directly on said valve element along the co-axis of said seats to control the motion of said valve element, characterized in that the valve comprises pressure-compensating means for pressure-compensating the valve with respect to pressure differential between two particular ones of said three ports, said pressure-compensating means comprising internal pilot passage structure within said body, a diaphragm that has an outer perimeter sealed to a wall portion of said pilot passage structure for creating in cooperation with said wall portion two zones that are fluid-isolated from each other by said diaphragm, said diaphragm having a central region that is affixed to a portion of said mechanism disposed within said pilot passage structure so as to move in unison with said mechanism, said pilot passage structure comprising a first pilot portion piloting one of said two particular ones of said three ports to a first of said zones and a second pilot portion piloting the other of said two particular ones of said three ports to a second of said zones and characterized in that there is an additional diaphragm that has an outer perimeter also sealed to said wall portion of said pilot passage structure for providing in cooperating with said wall portion and the first-mentioned diaphragm an axial boundary for said second zone that is opposite the axial boundary provided by said first-mentioned diaphragm for said second zone and for also providing in cooperating with said wall portion a third zone that is fluid-isolated from said second zone by said additional diaphragm, said additional diaphragm having a central region that is affixed to a portion of said mechanism disposed within said pilot passage structure so as to move in unison with said mechanism, and said pilot passage structure comprises a third pilot portion piloting to said third zone that one of said ports which is neither one of said two particular ones of said three ports.

10. A valve as set forth in claim 9 characterized in that said one of said two particular ones of said ports is said control port.

11. A valve as set forth in claim 10 characterized in that said first of said ports is said control port.

12. A three-way valve that is operated by a solenoid and comprises a valve body containing a source port adapted to be communicated to a source of pressure fluid, a control port adapted to be communicated to a load that is to be controlled, a drain port adapted to be communicated to a drain, and internal fluid passageway structure providing fluid communication between said ports, two valve seats each of which comprises a corresponding orifice and which are disposed in said passageway structure in coaxially-aligned, spaced-apart, face-to-face relation to axially-constrain between themselves within a first portion of said passageway structure a valve element which can move back and forth between said seats to alternately open and close said orifices, said passageway structure comprising a second portion that communicates a first of said ports with said first passageway portion, a third portion that communicates a second of said ports with a first of said orifices, and a fourth portion that communicates a third of said ports with a second of said orifices, a mechanism including said solenoid that acts directly on said valve element along the co-axis of said seats to control the motion of said valve element, characterized in that the valve comprises pressure-compensating means for pressure-compensating the valve with respect to pressure differentials between certain selected pairs of said three ports, said pressure-compensating means comprising internal pilot passage structure within said body, a pair of diaphragms each of which has an outer perimeter sealed to a wall portion of said pilot passage structure for creating in cooperation with said wall portion zones at opposites sides of each diaphragm, each diaphragm fluid-isolates the zone that is at one of its sides from the zone that is at its other side, each diaphragm also having a central region that is affixed to a portion of said mechanism disposed within said pilot passage structure so as to move in unison with said mechanism, said pilot passage structure comprising respective pilot portions piloting respective ones of said ports to respective ones of said zones.

13. A valve as set forth in claim 12 characterized in that there are three such zones and one of said three zones is common to both diaphragms.

14. A valve as set forth in claim 13 characterized in that said pilot passage structure comprises a first pilot portion piloting said one of said third zones to said control port.

15. A valve as set forth in claim 14 characterized in that said second of said three ports is said source port, said third of said three ports is said drain port, and said mechanism comprises a rod acting on a face of said valve element directly opposite a face of said valve element that faces said first orifice.

16. A valve as set forth in claim 12 including means for pulse width modulating said solenoid such that the pressure at said control port is caused to be a function of (a) the pressure at said source port, (b) the pressure at said drain port, and (c) the duty cycle of the pulse width modulation.

* * * * *